United States Patent

Fulwood et al.

[11] Patent Number: 5,945,754
[45] Date of Patent: Aug. 31, 1999

[54] ENERGY STORAGE AND CONVERSION APPARATUS

[75] Inventors: David Tod Fulwood; Nigel Paul Lloyd, both of Chester; Thomas Alexander Polak, Farnham, all of United Kingdom

[73] Assignee: British Nuclear Fuels PLC, Cheshire, United Kingdom

[21] Appl. No.: 09/053,016

[22] Filed: Apr. 1, 1998

[30] Foreign Application Priority Data

Oct. 3, 1995 [GB] United Kingdom .................... 9520160
Oct. 1, 1996 [WO] WIPO ..................... PCT/GB96/02410

[51] Int. Cl.$^6$ ....................................................... H02K 5/16
[52] U.S. Cl. .................. 310/74; 310/90; 74/572
[58] Field of Search ................. 310/74, 90, 90.5, 310/157; 74/572

[56] References Cited

U.S. PATENT DOCUMENTS

| | | | |
|---|---|---|---|
| 4,058,024 | 11/1977 | Gordon | 74/572 |
| 4,210,371 | 7/1980 | Gerkema et al. | 378/133 |
| 4,223,240 | 9/1980 | Theyse | 310/74 |
| 4,860,611 | 8/1989 | Flanagan et al. | 74/574 |
| 5,065,060 | 11/1991 | Takahashi et al. | 310/74 |

FOREIGN PATENT DOCUMENTS

| | | |
|---|---|---|
| 0 145 182 | 6/1985 | European Pat. Off. . |
| 2120401 | 8/1972 | France . |
| 27 25 002 | 12/1977 | Germany . |
| 2-17842 | 1/1990 | Japan . |
| 1262157 | 1/1985 | U.S.S.R. . |
| 950967 | 3/1964 | United Kingdom . |
| 1 381 528 | 1/1975 | United Kingdom . |
| 2 101 695 | 1/1983 | United Kingdom . |
| 1 115 079 | 9/1983 | United Kingdom . |
| 2 202 302 | 9/1988 | United Kingdom . |
| 2 293 281 | 3/1996 | United Kingdom . |
| WO 93/24765 | 12/1993 | WIPO . |
| 9605646 | 2/1996 | WIPO . |

Primary Examiner—Nestor Ramirez
Assistant Examiner—Joseph Waks
Attorney, Agent, or Firm—Nixon & Vanderhye P.C.

[57] ABSTRACT

An energy storage and conversion apparatus (1) comprising a containment (5) defining a vacuum chamber (7), a support shaft (9) within the vacuum chamber (7), a stator (11) on the shaft (9) and a cylindrical rotor (13) which, in use, is driven by the stator (11) to store energy as kinetic energy of the rotor (13) and acts with the stator (11) as a generator to release energy, wherein the rotor (13) is supported by the shaft (9) via an end cap (29) which, as the rotor (13) speed increases, deflects from a conical shape towards a planar shape. As a result, failure of the apparatus (1) does not occur when the rotor (13) expands due to centrifugal forces. Further, the position of the rotor (13) relative to the stator (11) and magnetic bearing on the shaft (9) is kept essentially constant, even if the length of the rotor (13) decreases due to Poisson effects.

10 Claims, 3 Drawing Sheets

ENERGY STORAGE AND CONVERSION APPARATUS

BACKGROUND OF THE INVENTION

1. Field of the Invention

This invention relates to energy storage and conversion apparatus, and in particular to an apparatus wherein a cylindrical rotor is driven by a stator within the rotor to store energy as kinetic energy of the rotor and wherein energy can be withdrawn from the rotor when the stator and rotor act as a generator.

2. Discussion of Prior Art

Energy storage and conversion apparatus of the aforementioned type have already been described in some of the present applicant's earlier patent specifications. The applicant has, however, continued to develop its energy storage and conversion apparatus and, as a result thereof, has invented an apparatus as herein described.

SUMMARY OF THE INVENTION

According to a first aspect of the present invention, there is provided an energy storage and conversion apparatus comprising a containment defining a vacuum chamber, a support shaft within the vacuum chamber, a stator on the shaft and a cylindrical rotor which, in use, is driven by the stator to store energy as kinetic energy of the rotor and acts with the stator as a generator to release energy, wherein the rotor is supported by the shaft via an end cap which, as the rotor speed increases, deflects from a conical shape towards a planar shape.

When the rotor is rotated at high speed, such as between approximately 800 Hz and 1200 Hz, radial expansion of the rotor can occur. By providing an end cap which deflects in the required manner, the end cap can continue to support the rotor and avoid failure of the apparatus, even at such high speeds.

Preferably the support shaft is substantially vertical and the end cap is mounted on the top of the support shaft and engages the upper end of the cylindrical rotor.

Further, the end cap preferably engages the rotor with a friction fit. Some form of glue or resin may, however, be applied between the rotor and the end cap to ensure that the rotor is held securely, if necessary.

Irrespective of whether a friction fit or a permanent bond is formed between the rotor and the end cap, the end cap is preferably strain matched to the rotor.

The end cap is preferably fitted such that it deflects downwardly as the rotor speed increases.

Further, as the speed of the rotor increases and the rotor expands radially, Poisson effects cause contraction of the rotor. This contraction of the rotor can affect the interaction of the rotor with a magnetic or electromagnetic support bearing mounted on the lower end of the support shaft. Hence, an additional advantage provided by the deflecting end cap is that the rotor is effectively lowered slightly relative to the support shaft as the end cap deflects, thereby keeping the rotor accurately aligned with the magnetic bearing on the support shaft. With this in mind, a typical figure for the amount of contraction of a carbon fibre rotor when rotating at the speeds given is in the region 3.5 mm per rotor length of 1 meter.

In theory, the end cap could be fitted such that it deflects upward, but this would clearly not assist in retaining the rotor in position on the support shaft.

Although the end cap may, at rest, make an angle of between 5° and 40° with the horizontal, a preferred angle is between 15° and 25°, more preferably about 20°. Such an angle avoids excess strain across the end cap and allows the end cap to deflect and lower the rotor, in use, by up to about 5 mm or so, if the end cap has a thickness of about 7.5 mm and a radius of about 130 mm.

Preferably the end cap comprises layers of carbon fibre. Further, the end cap may comprise layers of glass fibre. If glass fibre is used in combination with carbon fibre, the layers of glass fibre preferably overlie the carbon fibre. In any event, the fibres in each layer are preferably substantially uni-directional. As a result, the end cap has significant strength and reliability.

Although the end cap may be supported on the shaft by any appropriate means, a preferred means is a pin bearing which acts between the end cap and the support shaft.

According to a second aspect of the present invention, there is provided a pin bearing comprising a pin carrying a pin head mounted in a cup within a first cavity and a second cavity outside the first cavity, the second cavity communicating with the first cavity by a least one channel, wherein bearing oil within the cavities, during use, is circulated by rotation of the pin head in the cup between the two cavities to disperse heat generated between the pin head and the cup.

If the bearing oil is not circulated away from the cup, the temperature of the oil may increase to several hundred degrees centigrade, which would have a significant effect on the viscosity of the oil and, indeed, the oil may even boil. Clearly, if the viscosity of the oil varies significantly, the oil will not function satisfactorily.

In a preferred embodiment, a lip is provided on the pin for returning bearing oil driven up the pin from the first cavity to the second cavity. The lip may comprise a frustoconical portion which tapers towards the cavities.

An oil guard preferably surrounds the lip to direct bearing oil into the second cavity. This guard may be formed as part of a cap which closes the two cavities.

The cup of the pin bearing is preferably carried by a damping element which sits on guide struts attached to a housing of the pin bearing. Minor vibrations of the rotor may therefore be damped.

The damping element may include apertures through which the bearing oil circulates to and/or from the second cavity.

In a preferred embodiment, the pin head includes a spherical spiral groove which, during use, pumps the bearing oil.

As will be appreciated, an energy storage and conversion apparatus according to the first aspect of the present invention may include a pin bearing according to the second aspect of the invention.

According to a third aspect of the present invention, there is provided a pin bearing for a rotor with load relief start-up comprising a pin carrying a pin head received in a cup filled with bearing oil, means for biasing the cup towards the pin head and a ball bearing race acting to carry the pin and pin head until rotation of the pin head relative to the cup generates sufficient pressure in the bearing oil to provide a film of oil between the pin head and the cup to lift the rotor during use off the ball bearing race until the weight of the rotor is borne wholly by the pin and pin head acting on the cup.

Such a pin bearing prevents excessive wear occurring at low rot or speeds between the pin head and the cup, both of which are likely to be made of metal.

Although any appropriate biasing means may be used, an helical spring providing light pressure to the cup is perfectly acceptable.

According to another embodiment of pin bearing according to the present invention which provides load relief startup, there is provided a pin bearing comprising a pin carrying a pin head received in a cup, a passageway through the cup to a position below the pin head and a pressurised oil feed which, during start-up of the bearing, lifts the pin head off the cup to reduce friction between the pin head and the cup.

The pressurised oil feed may be deactivated during normal running of the pin bearing.

Load relief start-up may also be provided by means of a powerful axial electromagnet which can support the weight of the rotor during start-up. As the rotor approaches its operating speed, the electromagnet may be gradually phased off.

BRIEF DESCRIPTION OF THE DRAWINGS

Specific embodiments of the present invention are now described, by way of example only, with reference to the accompanying drawings, in which.

DETAILED DISCUSSION OF PREFERRED EMBODIMENTS

Figure 1:
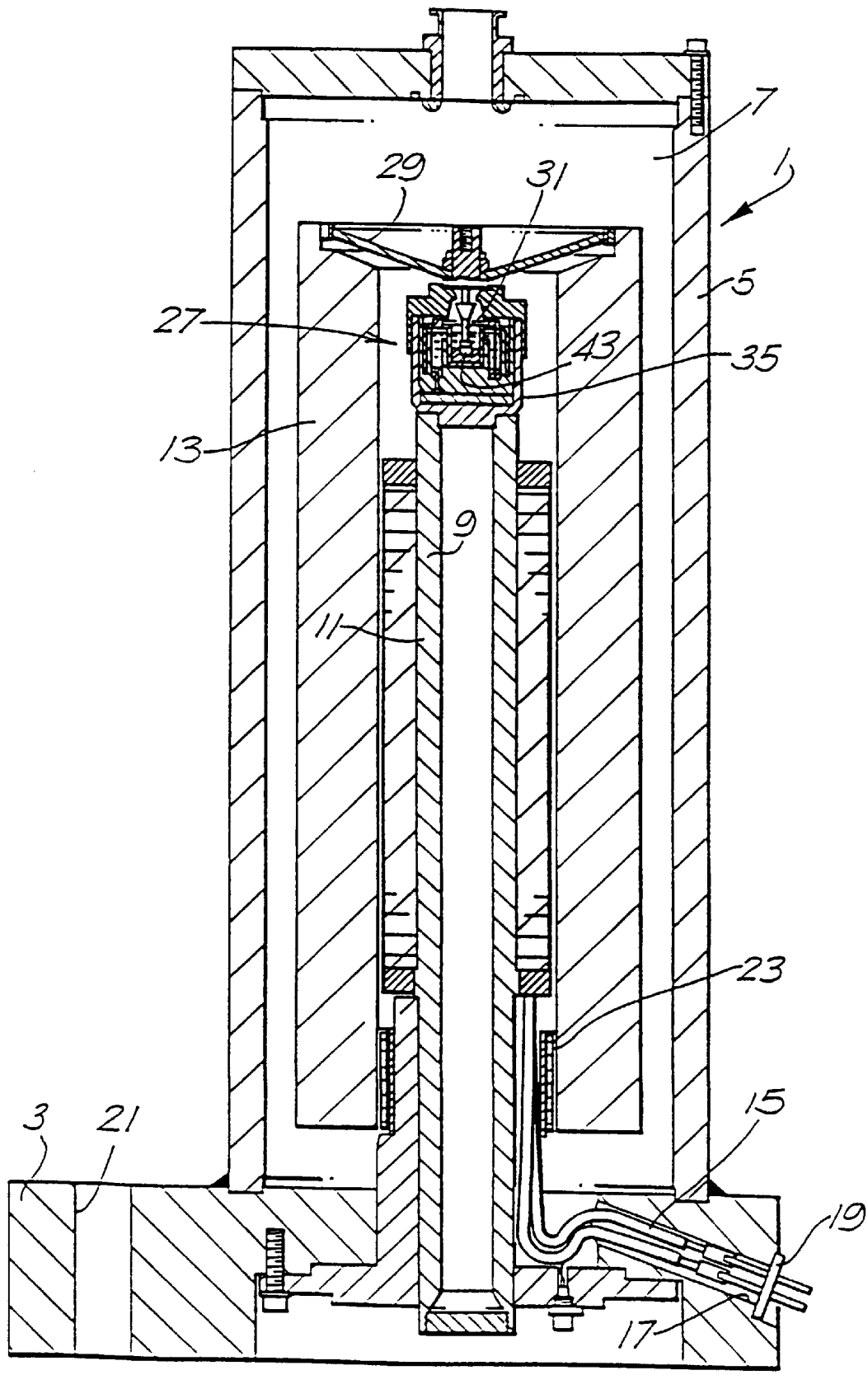
FIG. 1 is a sectional side view of an energy storage and conversion apparatus according to the present invention.
Figure 2:
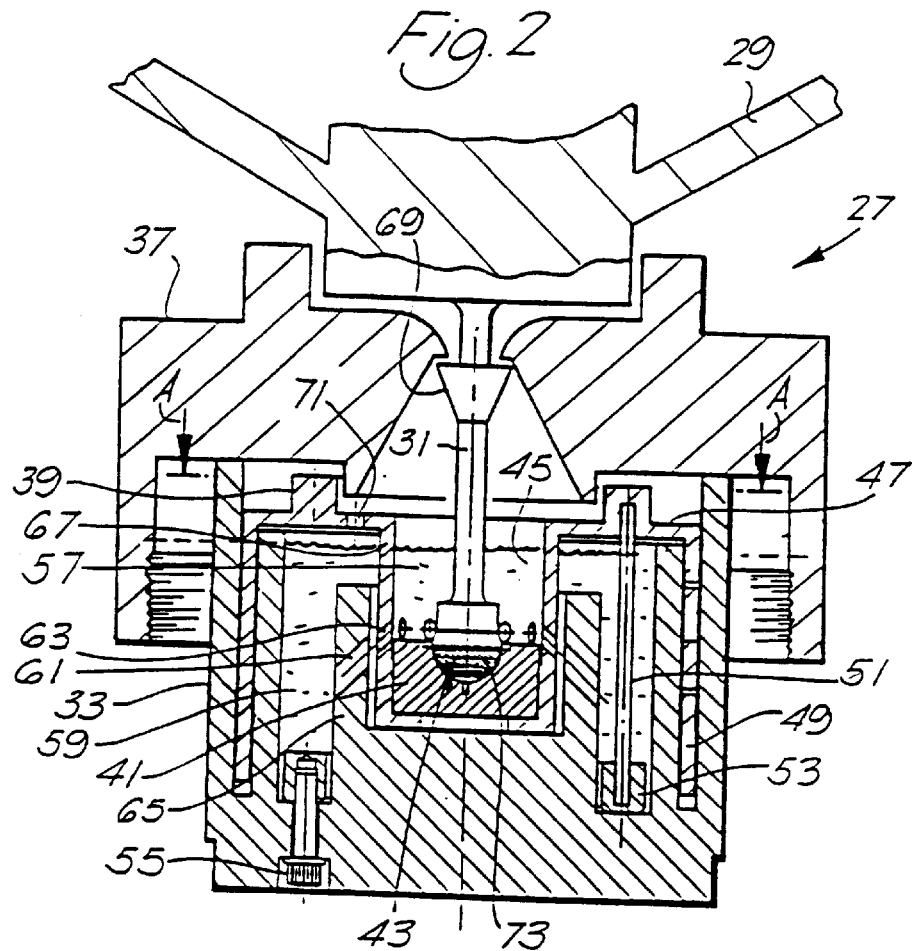
FIG. 2 is an enlarged sectional side view of the pin bearing incorporated in the apparatus of FIG. 1.
Figure 3:
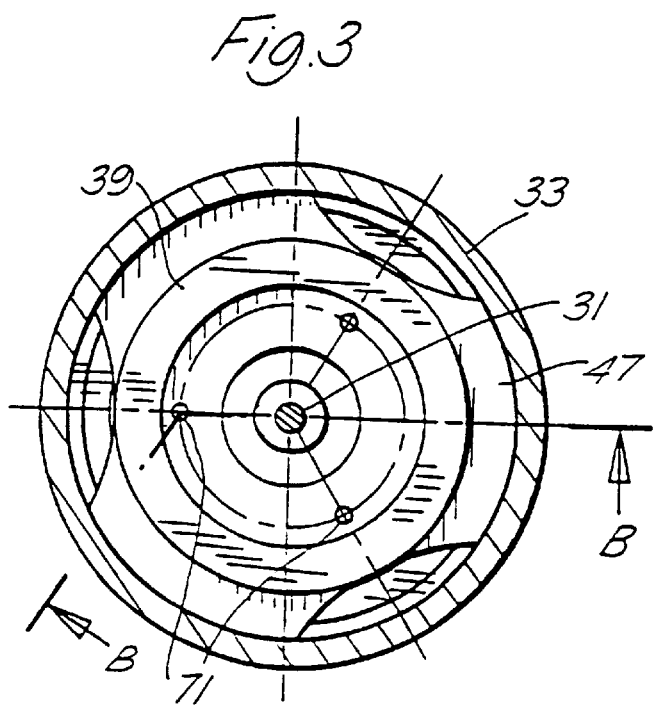
FIG. 3 is a section on A—A of FIG. 2.

With reference to FIGS. 1–3 of the accompanying drawings, an energy storage and conversion apparatus 1 comprises a base member 3, a containment 5 mounted on the base member 3 defining a vacuum chamber 7, a substantially vertical shaft 9 within the vacuum chamber 7, a stator 11 mounted on the shaft 9 and a cylindrical rotor 13 which, in use, is driven by the stator 11 to store energy as kinetic energy of the rotor 13 and acts with the stator 11 as a generator to release energy. Electrical contacts 15 for the stator 11 pass through an opening 17 in the base member 3 which is closed via a vacuum seal 19.

Stator 11 is not shown in any detail in FIG. 1, but may be of any appropriate type incorporating a core defining a plurality of poles, such as four poles, about which coils are wound to produce magnetic flux which is directed by the pole faces towards magnetic material embedded in the rotor 13 to cause the rotor 13 to rotate. In this way, energy can be stored as kinetic energy of the rotor. Conversely, if energy is to be withdrawn from the apparatus 1, the rotor 13 and stator 11 can act as a generator to produce an electrical output via the power electronics (not shown) of the apparatus 1.

The base member 3 of the apparatus 1 has significant strength by virtue of its thickness and the material from which it is made, which may be aluminium, for example. Holes 21, one of which is shown, through the base member 3 receive bolts (not shown) for securing the base member 3 to a floor or the like of considerable mass and strength. As a result, the energy storage and conversion apparatus I will be held firmly in position, even if the apparatus 1 fails.

The rotor 13 is formed from fibre reinforced composite materials. For example, the rotor 13 may have an inner layer of E-glass and an outer layer of carbon fibre composite. Any other suitable materials could, however, alternatively be used, provided that they provide the required properties for the rotor. In this regard, the inner layer of glass is relatively cheap and provides a reasonable amount of mass to the rotor 13. The E-glass is impregnated with magnetised material, in the form of particles or powder, between the fibres or tows of the glass fibre in the E-glass. The outer layer of the rotor 13 is included primarily to support the inner layer and is, therefore, formed of a material having significant strength when spinning at high speed, such as 800–1200 Hz. Carbon fibre composites are particularly suitable for this.

A magnetic bearing 23 is provided towards the lower end of the support shaft 9 under the stator 11. The magnet, which may be a permanent magnet or an electromagnet, interacts with the magnetic material embedded in rotor 13 to position the bottom end of the rotor 13 radially about the stator 11. In theory, the magnet 23 could be used to support some of the weight of the rotor 13, especially if the magnet 23 is an electromagnet. In such a scenario, the magnet would be controlling the axial position of the rotor 13 relative to the stator 11.

The rotor 13 is supported at its upper end by an end cap 29 via a friction fit. The end cap 29, when stationary, is essentially conical and tapers towards a pin bearing 27. The angle of inclination of the conical end cap 29 is in the region of 70–80° to the vertical. Hence, the end cap 29 is approximately 10–20° from being planar. These angles may, of course, vary, depending upon the particular application.

The end cap 29 is constructed by laying successive sheets of pre-shaped, pre-pregnated carbon fibre mats into a mold. The carbon fibres in each sheet are uni-directional, and each sheet is laid over the previous sheet at a predetermined angle until the required thickness of end cap is achieved. This ensures uniform strength over the entire section of the end cap. Although such an end cap performs its function quite adequately, there is a danger that fibres from the first and last layers running close to the edge of the cap may break away during operation. Accordingly, to fix these vulnerable fibres in place and prevent breaking away, a final layer of glass fibre is applied to both faces of the end cap. This is achieved by applying radial strips of uni-directional glass fibre mat to cover each entire surface. The glass fibre layer also performs a second function. In the carbon fibre construction of the end cap, the modulus of strain is low in the central mass of the cross-section, and at its highest value on the outside edges. In practice the modulus of strain of the inner layers is about half the modulus of strain of the fibres in the outer layers. The strain modulus of glass fibre is approximately half the value of carbon fibre, therefore the modulus of strain of the glass fibre layer on the outside faces of the end cap approximately match the modulus of strain in the centre portion of the end cap. This has the effect of equalising, or matching, the strain across the end cap cross-section.

The end cap 29 carries a pin 31 of the pin bearing 27. The pin bearing 27 is threadedly received at the top of the support shaft 9, as shown in FIG. 1. The pin bearing 27 is shown in detail in FIGS. 2 and 3 of the drawings.

With reference to FIG. 2 of the drawings, the pin bearing 27 comprises a housing 33 which, as shown in FIG. 1, is received in a case 35 threadedly attached to the top of the shaft 9. A non-rotating guard cap 37 closes the housing 33 and threadedly engages the case 35. A damping element 39, which carries a cup 41 into which the head 43 of the pin 31 is received, is housed within the housing 33. The damping element 39 defines a first cavity 45 in which the cup 41 and pin head 43 are positioned. An annular flange 47 extends around the first cavity 45 and supports a downwardly extending skirt 49 which is received in an annular slot in the housing 33. The flange 47 also carries three struts 51 which are all located at their bottom ends by an insert 53 which is fastened in the housing 33 by screws 55. The struts 51 prevent the damping element 39 from rotating, but allow radial motion relative to the housing 33. The bearing oil 57 between the housing 33 and downwardly extending skirt 49 damps any such radial motion.

A second cavity 59 for bearing oil 57 is provided in the housing 33 outside the first cavity 45. Passageways 61,63 extend through a wall 65 of the housing 33 and a wall 67 of the damping element 39 respectively to allow fluid communication between the first cavity 45 and the second cavity 59. Further, a frustoconical lip 69 is provided on the shaft of the pin 31 and apertures 71 are provided in the flange 47 of the damping element 39.

During use, rotation of the rotor 13 causes rotation of the pin 31 and pin head 43 in the cup 41. The pin head 43 has a spherical spiral groove pattern 73 on its surface which pumps the bearing fluid 57 between the surface of the pin head 43 and the cup 41 to raise the pin head 43 away from the cup 41, thereby reducing the friction therebetween. The bearing fluid 57 tends to travel up the shaft of the pin 31 due to its rotational motion. On reaching the lip 69, the oil 57 is thrown outwardly by centrifugal forces and lands on the oil guard 37 adjacent thereto. The oil 57 subsequently runs down the guard 37 and drops back into the second cavity 59 via the apertures 71 in the flange 47. Hence, hot bearing oil 57 from the first cavity 45 is mixed with the much cooler bearing oil within the second cavity 59. Cooling of the bearing oil 57 thereby results.

As will be appreciated, the level of bearing oil 57 within the first and second cavities 45,59 is kept substantially the same by virtue of the communicating passageways 61,63 joining the two cavities. Hence, recirculation of the bearing oil 57 results.

Radial expansion of the rotor 13 occurs as rotor speed is increased, reaching maximum expansion at full operating speed. The end cap 29, which is initially conical, deflects towards a planar configuration. The deflection of the end cap 29 is designed to match the radial expansion of the rotor 13, thus maintaining the initial strain between the end cap 29 and rotor 13. Failure of the joint between the end cap 29 and the rotor 13 is thereby avoided. Further, due to Poisson effects, as the rotor expands radially it contracts axially. The deflecting of the end cap 29 assists in negating this axial shortening because, as the end cap 29 deflects, the rotor 13 is effectively lowered. In this way, interaction between the magnet 23 and the rotor 13 is kept essentially constant. Problems associated with the set-up of the apparatus can, therefore, be avoided.

Figure 4:
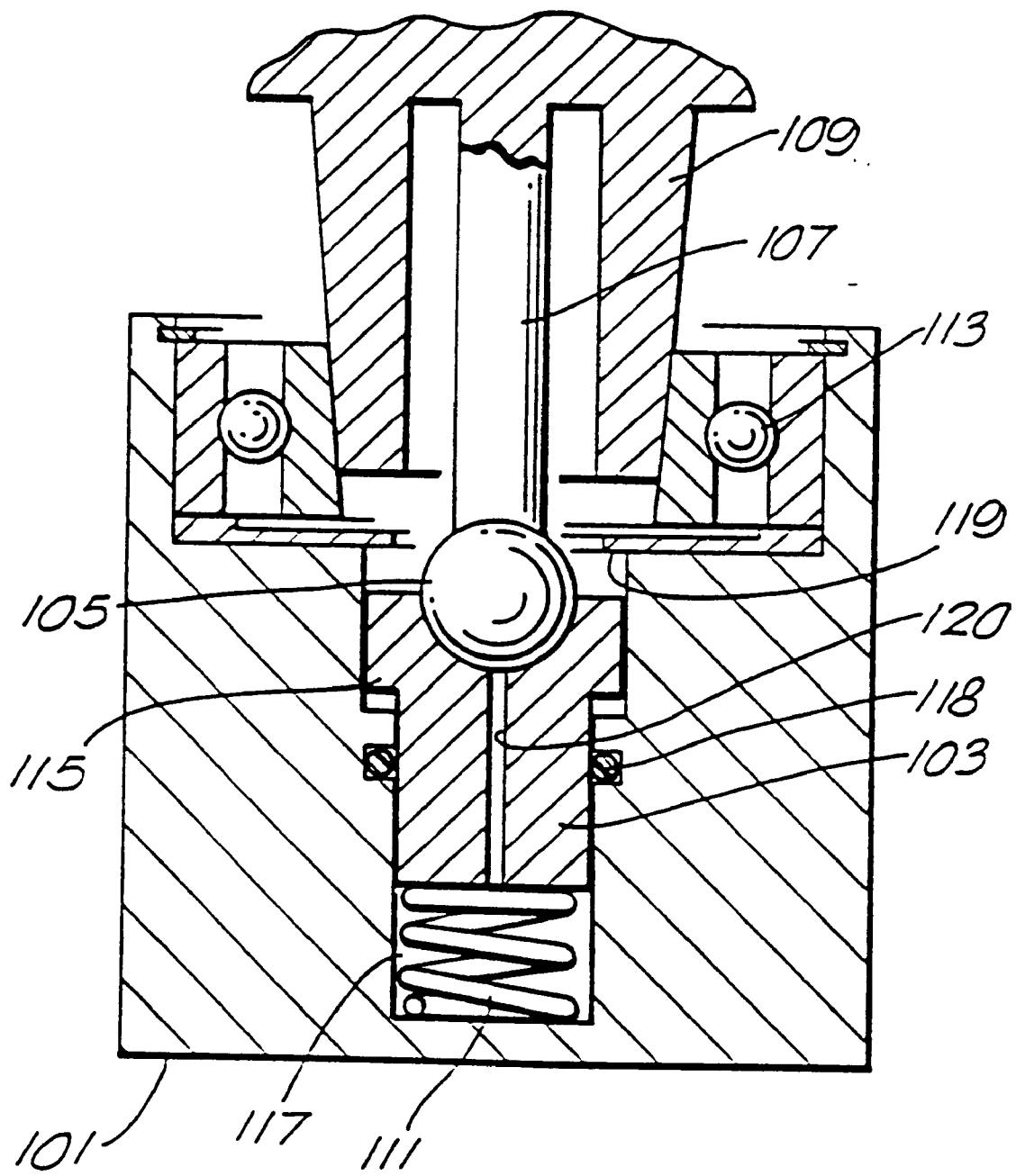
FIG. 4 is a schematic side sectional view of a pin bearing with load relief start-up according to the present invention.

Turning now to FIG. 4 of the drawings, another embodiment of pin bearing, this time with load relief start-up, is shown. Load relief during start-up is beneficial because significant wear can occur between a pin head and a cup before the pin bearing is running at a sufficient speed to generate an oil film between the bearing surfaces.

With reference to FIG. 4, a housing 101 carries a cup 103 in which a pin head 105 of a pin 107 sits. The pin 107 is attached to an end cap (not shown). A downwardly extending tapered annular skirt 109 surrounds the pin 107. The pin bearing also includes an helical spring 111 applying a light upwards pressure on the cup 103 to urge the cup 103 towards the pin head 105. A ball bearing race 113 is also provided in the housing 101.

During start-up of the pin bearing, the weight of the rotor and end cap is borne by the skirt 109 engaged in the tapered inner race of ball bearing race 113. The cup 103 is lightly loaded against the pin head 105 by the pressure exerted by spring 111. As rotor speed increases, the bearing gradually generates pressure by virtue of the bearing oil (not shown) being pumped between the pin head 105 and the cup 103 due to the spherical spiral grooves on the pin head 105. The increasing pressure generates a film of oil between the pin head 105 and the cup 103, and further pressurises the oil chamber 117 under the cup by means of interconnecting passageway 120. The pressure in the oil chamber 117 is maintained by the bearing pumping action and the oil seal 118. As the oil pressure thus generated increases with speed, the cup 103 lifts, and with it, the rotor, until the cup 103 abuts with the disc 119. As this occurs, the skirt 109 disengages from the ball bearing race 113 and the weight of the rotor and end cap is borne entirely by the pin 107. Hence, the ball bearing race 113 carries the significant load of the end cap and rotor during initial start-up of the pin bearing. In this way, wear on the pin head 105 and cup 103 is reduced.

The ball bearing race 113 is supported on the disc 119 which encapsulates the cup 103, thereby retaining the cup 103 within the housing 101 even if the apparatus is turned upside down during transport, for example.

Another embodiment of pin bearing incorporating load relief start-up, which is not shown in the drawings, will now be described. In this embodiment, a passageway is formed through the cup to a position below the pin head of the pin bearing. A pressurised oil feed communicates with the passageway so that, during start-up, pressurised oil is fed into the bearing cup directly under the pin head. If the pressure is sufficient, the pin head is separated from the cup almost immediately, thereby avoiding wear between the two component parts.

It will of course be understood that the present invention has been described above purely by way of example, and that modifications of detail can be made within the scope of the invention.

We claim:

1. An energy source and conversion apparatus comprising
   a containment defining a vacuum chamber,
   a support shaft within the vacuum chamber,
   a stator on the shaft and
   a cylindrical rotor which, in use, is driven to a variable rotor speed by the stator to store energy as kinetic energy of the rotor and acts with the stator as a generator to release energy,
   wherein the rotor is supported by the shaft via an end cap which, as the rotor speed increases, deflects from a conical shape towards a planar shape.

2. An apparatus as claimed in claim 1, wherein the support shaft is substantially vertical and the end cap is mounted on a top of the support shaft and engages an upper end of the cylindrical rotor.

3. An apparatus as claimed in claim 1, wherein the end cap engages the rotor with a friction fit.

4. An apparatus as claimed in claim 1, wherein the end cap is strain matched to the rotor.

5. An apparatus as claimed in claim 1, wherein the end cap deflects downwardly as the rotor speed increases.

6. An apparatus as claimed in claim 1, wherein the end cap comprises layers of carbon fibre.

7. An apparatus as claimed in claim 6, wherein the fibres in each layer are substantially unidirectional.

8. An apparatus as claimed in claim 1, wherein the end cap comprises layers of glass fibre.

9. An apparatus as claimed in claim 8, wherein the layers of glass fibre overlie the carbon fibre.

10. An apparatus as claimed in claim 1, wherein a pin bearing acts between the end cap and the support shaft.

* * * * *